UNITED STATES PATENT OFFICE.

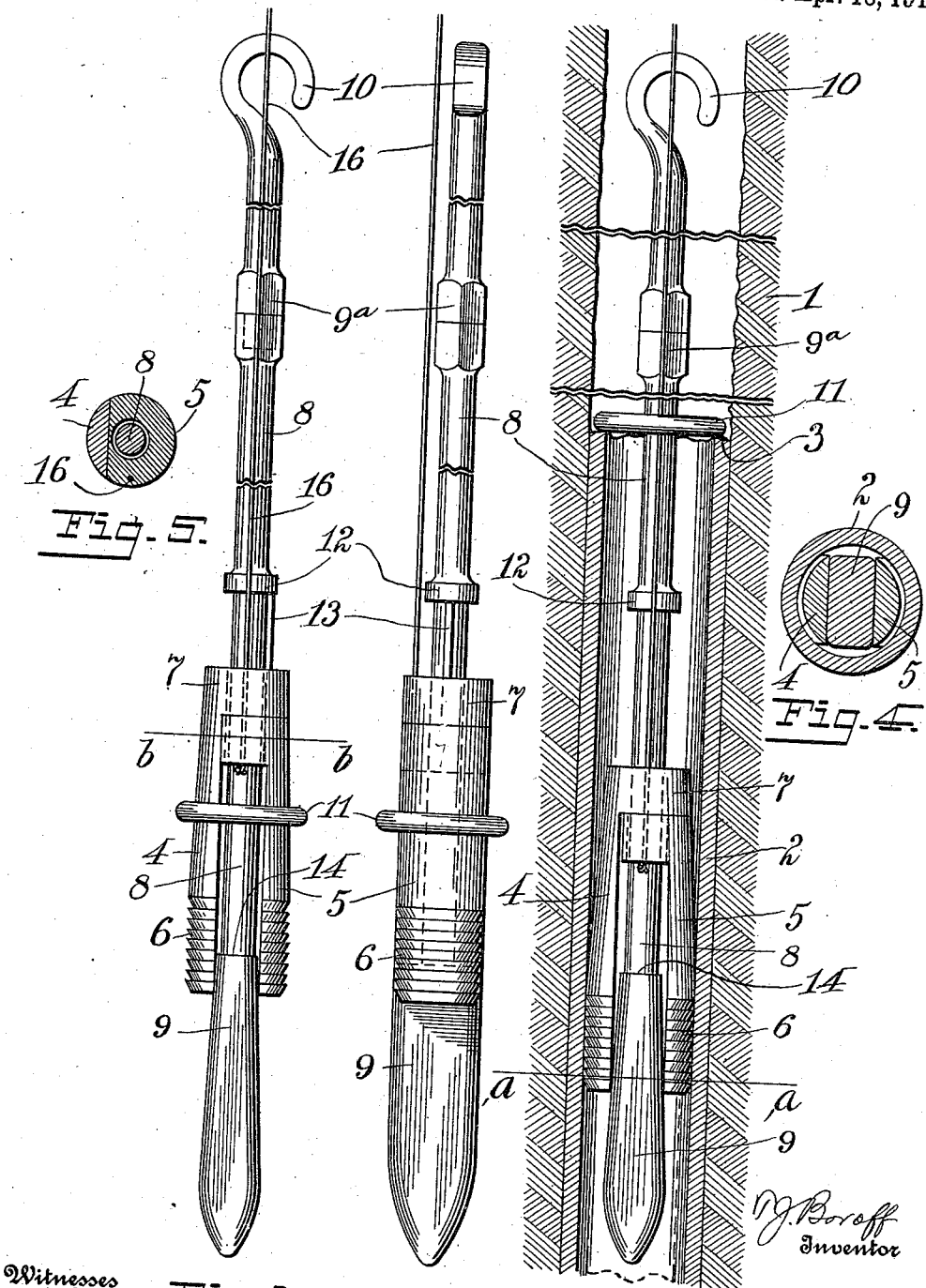

THOMAS JEFFERSON BOROFF, OF DAYTON, OHIO.

TUBE-EXTRACTOR.

989,757. Specification of Letters Patent. Patented Apr. 18, 1911.

Application filed October 14, 1910. Serial No. 587,032.

*To all whom it may concern:*

Be it known that I, THOMAS JEFFERSON BOROFF, a citizen of the United States, residing at Dayton, in the county of Montgomery and State of Ohio, have invented certain new and useful Improvements in Tube-Extractors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in tools for extracting the broken tubes or piping from drilled or driven wells.

The object of the invention is to provide a device of the above type that is simple in construction, effective and easy to manipulate, and which may readily be extracted from the tube.

The novel and advantageous features will be set forth in the following specification, and pointed out in the claim.

Referring to the accompanying drawings, Figure 1 is a side elevation of the device. Fig. 2 is a side elevation at a right angle to that shown in Fig. 1. Fig. 3 is a view of the tool or implement placed in the tube or pipe, preparatory to extracting the tube or pipe. Fig. 4 is a section on the line *a—a* of Fig. 3. And Fig. 5 is a section on the line *b—b* of Fig. 1.

In the drawings and description similar reference characters indicate corresponding parts.

In the said drawings, 1 represents the ground or well into which a tube or pipe 2 has been driven, and which has been detached or broken off at a point 3 below the surface of the ground, and is inaccessible from the surface of the ground. Under these conditions the tool or implement is utilized to extract the tube or pipe 2 below the surface of the ground without excavating around the pipe to remove it. The pipe within the ground may be removed by the implement and another section or length of piping or tubing be attached thereto and reinserted to bring the end of the driven pipe above the surface of the ground.

The tool and its operation is described as follows: 4 and 5 designate two jaws or clamping members, the lower outer portions of which are provided with upwardly pointing teeth 6 which are adapted to engage the inner adjacent sides of the pipe or tubing when the said members 4 and 5 are expanded in the manner presently described. The said jaws or clamping members 4 and 5 are provided with apertured heads 7 through which an operating rod 8 passes loosely and extends up in proximity to the surface of the ground. Rigidly attached to the lower end of said operating rod 8 is a wedge or expanding head 9, the narrower portion of which is uppermost. This wedge lies between the clamping members 4 and 5, and is movable therebetween from the rod 8, said wedge being adapted to expand the clamping members 4 and 5 against the inner sides of the tube, as in Fig. 3, or to permit said clamping members to contract, as in Fig. 1, for insertion in the pipe. It will be readily seen that the expansion of said members occurs when the wedge is drawn upwardly and the contraction of the members is permitted when the wedge is lowered. The operating rod may be of any length, or it may be made in sections provided with a coupling member or union 9ª, and on its upper end it is provided with a suitable device which may be in the form of a hook 10 for the connection of a chain or other member in case the pipe to be extracted is at a distance below the surface of the ground greater than the length of the tube.

To insert the tool in the pipe or tubing, the clamping members 4 and 5 are set in an upper position, and in engagement with the upper portion of the wedge 9; this places said clamping members in their contracted position. The upper portions of said members, it will be observed, are tapered inwardly in order to allow them to be held in their contracted positions by a ring 11, which drops loosely over said member until arrested, as is shown in Fig. 1. When the tool is inserted in the tube, this ring 11 frees the clamping members by engaging the top or upper end of the tube, and said members are thus released, allowing them to be lowered into the tube and expanded by the wedge 9. It will be understood that the ring 11 is instrumental only in holding the clamping members in a position to enter the mouth of the tube. When inserting the tool within the tube or pipe to be removed, there is liability of the lower ends of the clamping members 4 and 5 engaging the end of said tube, and to thus release said clamping members from engagement with the wedge 9 and to thus allow the wedge to enter the pipe or tubing without them. In order to prevent this possibility, there is provided a flange 12 on the rod 8. Between this flange and the top of the clamping members, there may be inserted one or more pins 13 which are instrumental in preventing said clamping members from moving upwardly should their lower ends engage the ends of the pipe or tubing. After said clamping members have been inserted in the tube, the wedge 9 is drawn upwardly by means of the operating rod 8, and this operation expands the clamping members 4 and 5, as before stated. When the rod 8 is drawn up, the pins 13 drop from their positions, as the clamping jaws or members 4 and 5 are then under the absolute control of the wedge 9. After the pipe or tubing has been withdrawn a sufficient extent, the tool is extracted by driving the wedge 9 downwardly by means of the rod 8. This releases the clamping members 4 and 5 from engagement with the tool. The rod 8 is then given a quarter turn, which places the shoulder 14 or upper end of the wedge, under the lower ends of the clamping members 4 and 5. An upward movement of the operating rod 8 will then extract said clamping members, and the tool in its entirety.

It will be observed from Fig. 2, that the width of the wedge 9 is greater in one direction than in the other. This is desirable in order to provide a bearing surface for the clamping members, which is substantially equal to the width of the clamping members. In order to prevent the clamping members 4 and 5 dropping by their own weight when the wedge 9 is lowered, there is provided a wire or suitable cord 16, which is attached to the apertured heads 7, and extends upwardly out of the well. When the wedge 9 is lowered, the said clamping members may be drawn upwardly to allow the shoulder 14 to be placed under the lower ends of said clamping members.

I claim:

In a tube extractor, the combination with an expanding wedge having an operating rod extended therefrom, said operating rod having an annular enlargement at a suitable point above the wedge, of two clamping members having their outer surfaces tapered upwardly and serrated below said tapered portion, said clamping members having their upper ends terminated in apertured heads through which the operating rod loosely passes, a clamping ring adapted to hold said clamping members in their contracted position while the implement is being inserted in the tubing to be extracted, and means engaging the annular enlargement on the operating rod and the upper end of the clamping members, to prevent said clamping members from moving upward when the implement is being inserted in the tubing.

In testimony whereof I affix my signature, in presence of two witnesses.

THOMAS JEFFERSON BOROFF.

Witnesses:
MINNIE BOROFF,
HOWARD S. SMITH.

---

Copies of this patent may be obtained for five cents each, by addressing the "Commissioner of Patents, Washington, D. C."